United States Patent
Wang

(10) Patent No.: US 10,092,865 B2
(45) Date of Patent: Oct. 9, 2018

(54) METHOD FOR PRODUCING COMPOSITE FILTER TUBE AND FILTER ELEMENT MADE OF MULTILAYER METAL MESH AND METAL POWDERS

(71) Applicant: Dongwei Wang, Shaoguan (CN)

(72) Inventor: Dongwei Wang, Shaoguan (CN)

(*) Notice: Subject to any disclaimer, the term of this patent is extended or adjusted under 35 U.S.C. 154(b) by 478 days.

(21) Appl. No.: 14/758,616

(22) PCT Filed: Aug. 19, 2013

(86) PCT No.: PCT/CN2013/081742
§ 371 (c)(1),
(2) Date: Jun. 30, 2015

(87) PCT Pub. No.: WO2015/010351
PCT Pub. Date: Jan. 29, 2015

(65) Prior Publication Data
US 2015/0352469 A1    Dec. 10, 2015

(30) Foreign Application Priority Data

Jul. 22, 2013 (CN) .......................... 2013 1 0308196

(51) Int. Cl.
*B01D 29/00* (2006.01)
*B01D 29/11* (2006.01)
(Continued)

(52) U.S. Cl.
CPC ............ *B01D 29/111* (2013.01); *B01D 39/12* (2013.01); *B01D 39/2034* (2013.01);
(Continued)

(58) Field of Classification Search
CPC .. B01D 29/111; B01D 39/12; B01D 39/2034; B01D 2239/0672; B23K 9/0253;
(Continued)

(56) References Cited

U.S. PATENT DOCUMENTS 3,690,606 A * 9/1972 Pall .................... B01D 39/12
210/510.1
3,795,288 A * 3/1974 Pall .................... B01D 39/12
181/224
(Continued)

FOREIGN PATENT DOCUMENTS

CN     201572564 U     9/2010
CN     101987267 A     3/2011
(Continued)

OTHER PUBLICATIONS

International Search Report; PCT/CN2013/081742; International Filing Date: Aug. 19, 2013, 2 pgs.

*Primary Examiner* — Richard Chang
(74) *Attorney, Agent, or Firm* — Schmeiser, Olsen & Watts, LLP

(57) ABSTRACT

A method for producing a composite filter tube and filter element made of a multilayer metal mesh and metal powders, including: knitting to obtain metal meshes of different mesh numbers, obtaining a layered structure by means of a lamination method, then putting the layered structure in a vacuum furnace for sintering processing, sintering a metal composite layer to obtain a composite filter sheet and tube made of a multilayer metal mesh and metal powders with a multilayer metal mesh as a structure support layer and a metal powder sinter structure as a filter layer, then rolling the composite filter sheet and tube into a tubular filter element by using a shaping machine, and welding to obtain a composite filter tube and filter element product made of a multilayer metal mesh and metal powders.

8 Claims, 3 Drawing Sheets

| Powder Tube No. | Filtration flux under test pressure drop | | | | | Notice |
|---|---|---|---|---|---|---|
| | 5KPa | 10KPa | 15KPa | 20KPa | 30KPa | |
| Importing filter element from overseas | 17.05 | 14.28 | 53.88 | 66.18 | 104.71 | |
| Domestic filter element of the same type | 14.28 | 28.43 | 40.26 | 58.22 | 87.15 | |
| Powder sintered mental filter tube and filter element of asymmetric structure with strengthening phrase | 52.12 | 105.9 | 133.52 | 204.06 | / | The pressure of air compressor cannot meet the need |

(51) Int. Cl.
| | |
|---|---|
| *B01D 39/20* | (2006.01) |
| *B23K 9/025* | (2006.01) |
| *B23K 10/02* | (2006.01) |
| *B22F 7/08* | (2006.01) |
| *B22F 3/10* | (2006.01) |
| *B22F 3/11* | (2006.01) |
| *B22F 5/10* | (2006.01) |
| *B22F 7/04* | (2006.01) |
| *B01D 39/12* | (2006.01) |

(52) U.S. Cl.
CPC .............. *B22F 3/1017* (2013.01); *B22F 3/11* (2013.01); *B22F 5/106* (2013.01); *B22F 7/04* (2013.01); *B22F 7/08* (2013.01); *B23K 9/0253* (2013.01); *B23K 10/02* (2013.01); *B01D 2239/0672* (2013.01); *Y10T 29/4989* (2015.01)

(58) Field of Classification Search
CPC .......... B23K 10/02; B22F 3/1017; B22F 7/08; B22F 5/106; B22F 7/04; B22F 3/11; Y10T 29/4989

See application file for complete search history.

(56) References Cited

U.S. PATENT DOCUMENTS

| | | | |
|---|---|---|---|
| 6,152,978 A * | 11/2000 | Lundquist | B01D 39/12 55/385.1 |
| 2007/0220856 A1* | 9/2007 | Cho | B01D 39/2041 55/525 |
| 2016/0184751 A1* | 6/2016 | Wertz | B01D 39/163 55/486 |

FOREIGN PATENT DOCUMENTS

| | | |
|---|---|---|
| CN | 102059024 A | 5/2011 |
| CN | 102059340 A | 5/2011 |
| JP | 2008256364 A | 10/2008 |

* cited by examiner

| Powder Tube No. | Filtration flux under test pressure drop ||||| Notice |
|---|---|---|---|---|---|---|
| | 5KPa | 10KPa | 15KPa | 20KPa | 30KPa | |
| Importing filter element from overseas | 17.05 | 14.28 | 53.88 | 66.18 | 104.71 | |
| Domestic filter element of the same type | 14.28 | 28.43 | 40.26 | 58.22 | 87.15 | |
| Powder sintered mental filter tube and filter element of asymmetric structure with strengthening phrase | 52.12 | 105.9 | 133.52 | 204.06 | / | The pressure of air compressor cannot meet the need |

FIG. 1

METHOD FOR PRODUCING COMPOSITE FILTER TUBE AND FILTER ELEMENT MADE OF MULTILAYER METAL MESH AND METAL POWDERS

CROSS-REFERENCE TO RELATED APPLICATIONS

This application claims priority to PCT Application No. PCT/CN2013/081742, having a filing date of Aug. 19, 2013, based on CN 201310308196.6, having a filing date of Jul. 22, 2013, the entire contents of which are hereby incorporated by reference.

FIELD OF TECHNOLOGY

The following relates to the production technology field of oil refining and filtering equipment, and more specifically, to a method for producing composite filter tube and filter element made of multilayer metal mesh and metal powders applied to the S-Zorb units 101, 102, 103, 104, 105, 110, 111, and 108, raw oil filter 104 units, and hydrotreating F100-B units of China Petroleum and Chemical Corporation.

BACKGROUND

Referring to FIG. 1, filter materials are required to provide as high of a filtering flow rate as possible while the filter itself has very low filtration resistance so as to make a larger filtration flux possible, thus reducing energy consumption. However, in practice, for example, various metal-mesh filters and common metal-powder tubes have the disadvantage that filter fineness and filtration flux cannot be achieved simultaneously, i.e. if the filtration flux is high, the filter fineness cannot meet the requirements; when filter fineness is adequate, and the filters cannot meet the requirements in the filtration flux.

In the application field of the petrochemical and steel industries, filters operating in high pressure and high temperature conditions often have low filter fineness that leads to leakage of catalysts and damaged valves and other equipment, causing the whole filtering system to fail and reducing the yield or stopping the production.

At present, the operating pressure differential of the current metal filter element used by China Petroleum and Chemical Corporation in the S-Zorb unit is generally 2.5 mpa-6 mpa. Such metal filter elements have low filtration flux, which leads to low capacity of the whole device.

SUMMARY

An aspect relates to a method for producing composite filter tube and filter element made of multilayer metal mesh and metal powders featuring low filtration resistance, large filtration flux, and good pressure-withstand capability.

This aspect takes the following technical solution to solve the technical problems: a method for producing composite filter tube and filter element made of multilayer metal mesh and metal powders, having the processing steps as below: First, weave wires to form metal mesh of different mesh numbers, and then stack up the metal mesh of different mesh numbers to obtain a layered structure on a principle that the mesh number increases from one side to the other, and the number of layers is 1~5; then put the layered structure in a vacuum furnace for 10~30 hrs uninterruptedly sintering at 900~1500° C. to obtain a multilayer metal mesh; after cooling down, take the aforesaid multilayer metal mesh out, make a metal composite layer made of metal powders with a mesh number of 100~600 on a side with higher mesh number through electrostatic spraying or common spraying and casting method with a thickness of the metal composite layer controlled within 0.1~0.5 mm, and then sinter the metal composite layer together with the multilayer metal mesh at 900~1500° C., and after cooling down, a composite filter sheet and tube made of a multilayer metal mesh and metal powders with the multilayer metal mesh as a supporting layer and sintered metal powders as a filtering layer is obtained; then take the composite filter sheet or tube out and roll it into a tubular filter element with a forming machine; weld a middle seam of the tubular filter element with an argon arc welding machine or plasma welding machine to obtain ft a composite filter tube and filter element made of multilayer metal mesh and metal powders.

The supporting layer is a composite one consisting of multiple layers of metal meshes.

The supporting layer has a thickness of 1~19 mm and is formed by stacking up multiple layers of metal meshes with a filter fineness of 1 to 1000 and sintering.

The supporting layer is made by weaving metal wires and may be sintered with a filtering layer to form a dual-layer composite structure, or be formed with a metal powder sheet to a composite structure.

The filtering layer has a mesh number of 100~1000 and is attached on the supporting layer and made by low temperature spraying (such as plasma spraying or common spraying) of metal powders and sintering together with the supporting layer.

Examples of metal powders used for the filtering layer are Fe, Co, Ni, W, Mo, Cr, Cu, Al, Ti, Zn, Sn, Ta, Nb, and Zr elementary substance metal powders, or alloy powders combining multiple selections of these metal elements.

Examples of metal meshes used for the supporting layer are formed by weaving Fe, Co, Ni, W, Mo, Cr, Cu, Al, Ti, Zn, Sn, Ta, Nb, and Zr elementary substance metal wires, or alloy wires combining multiple ones of these metal elements.

The composite filter sheet and tube made of a multilayer metal mesh and metal powders is processed to form an asymmetric powder-sintered filter tube with a composite structure by rolling and welding processes.

The beneficial effects of embodiments of the present invention are as below: the composite structure with the multi-layer metal meshes as the supporting layer and the metal powder as the sintered layer has low filtration resistance, great filtration flux, and good pressure withstand capability, and is intended for use with S-Zorb units 101, 102, 103, 104, 105, 110, 111, and 108, raw oil filter 104 units, and hydrotreating F100-B units of China Petroleum and Chemical Corporation; it can increase the filtration flux by 10%~50% with the other components in the unit, causing the yield to go up substantially.

BRIEF DESCRIPTION

Some of the embodiments will be described in detail, with reference to the following FIGURE, wherein like designations denote like members, wherein:

FIG. 1 is a comparison between the test filtration flux of embodiments of the present invention and the products of the same kind made in China and made in other countries with the filter fineness of 1μ~10μ;

DETAILED DESCRIPTION

Figure 2:
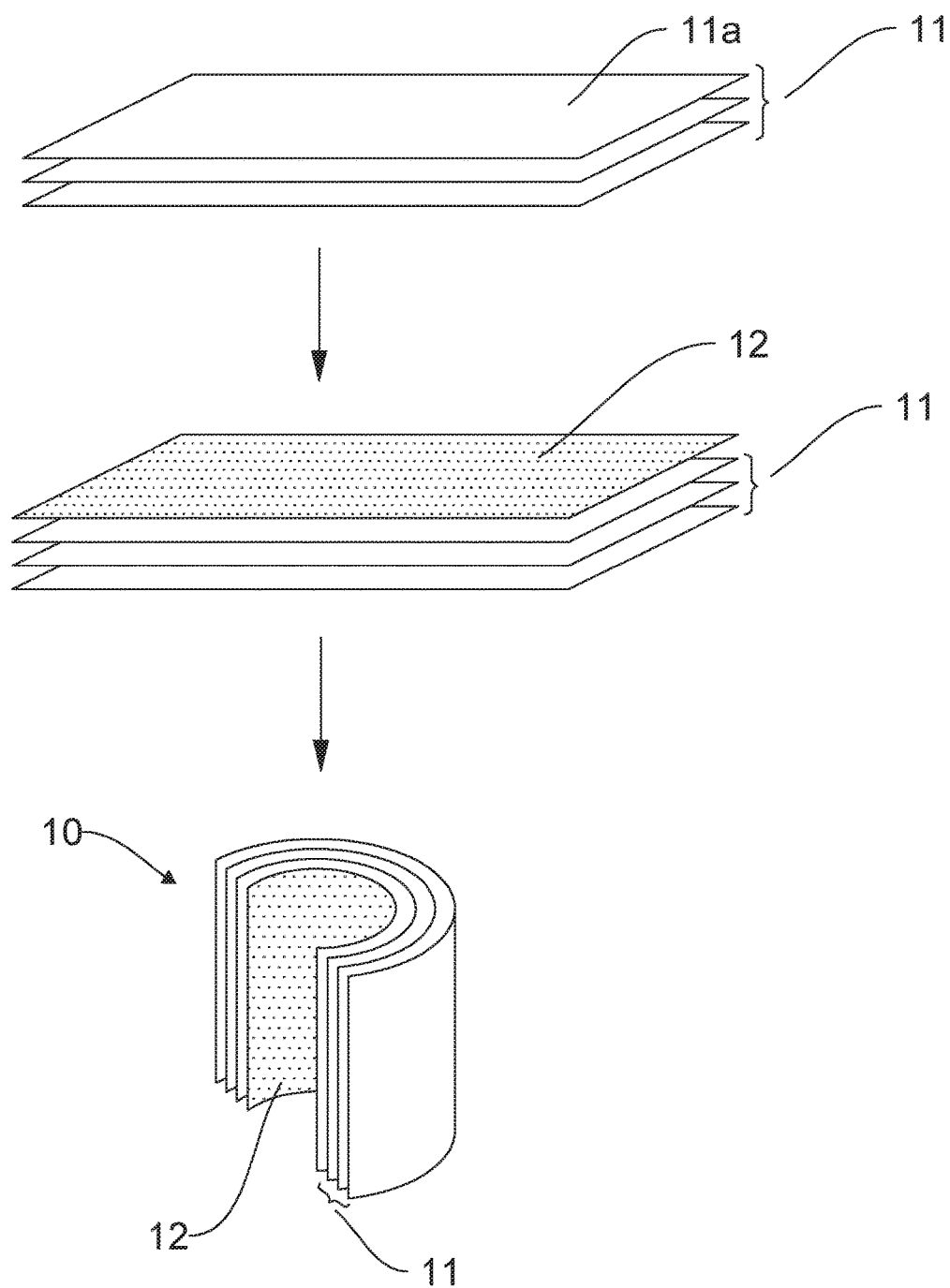
FIG. 2 is a composite filter tube and filter element made of multilayer metal mesh and metal powders.
Figure 3:
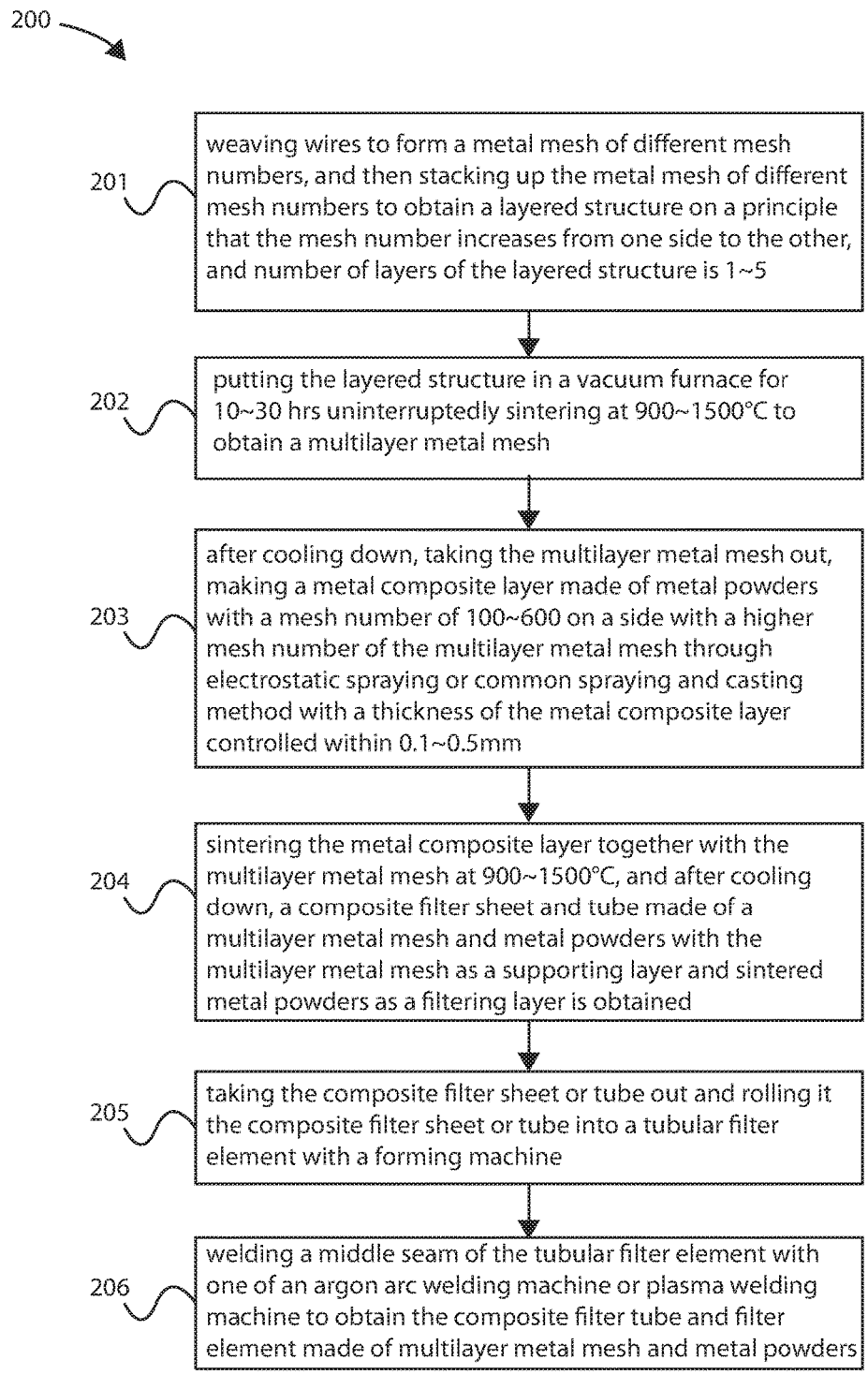
FIG. 3 is a flowchart for a method for producing a composite filter tube and filter element made of multilayer metal and metal poweders.

A method for producing composite filter tube and filter element made of multilayer metal mesh and metal powders, having the following processing steps:

Firstly weaving wires to form metal mesh of different mesh numbers, and then stacking up the metal mesh of different mesh numbers to obtain a layered structure on a principle that the mesh number increases from one side to the other, and the number of the layers is 1~5∴; then putting the layered structure in a vacuum furnace for 10~30 hrs uninterruptedly sintering at 900~1500° C. to obtain a multilayer metal mesh; after cooling down, taking the aforesaid multilayer metal mesh out, making a metal composite layer made of metal powders with a mesh number of 100~600 on a side with higher mesh number of the multilayer metal mesh through electrostatic spraying or common spraying and casting method with a thickness of the metal composite layer controlled within 0.1~0.5 mm, and then sintering the metal composite layer together with the multilayer metal mesh at 900~1500° C., and after cooling down, a composite filter sheet and tube made of a multilayer metal mesh and metal powders with the multilayer metal mesh as a supporting layer and sintered metal powders as a filtering layer is obtained; then taking the composite filter sheet or tube out and rolling it into a tubular filter element with a forming machine; welding a middle seam of the tubular filter element with an argon arc welding machine or plasma welding machine to obtain a composite filter tube and filter element made of multilayer metal mesh and metal powders.

The supporting layer is a composite structure with a thickness of 1~10 mm and formed by stacking up multiple layers of metal meshes with a filter fineness of 20 to 1000 and sintering. The supporting layer is made by weaving metal wires and may be sintered with a filtering layer to form a dual-layer composite structure, or be formed with a metal powder sheet to a composite structure. Examples of metal meshes used for the supporting layer are formed by weaving Fe, Co, Ni, W, Mo, Cr, Cu, Al, Ti, Zn, Sn, Ta, Nb, and Zr elementary substance metal wires, or alloy wires combining multiple ones of these metal elements.

The composite filter sheet and tube made of a multilayer metal mesh and metal powders has the multilayer metal mesh as the supporting layer and the sintered metal powders as the filtering layer. The filtering layer has a the mesh number of 100~1000 and is attached on the supporting layer and made by low temperature spraying (such as flame spraying or plasma spraying) of metal powders and sintering together with the supporting layer. Examples of metal powders used for the filtering layer are Fe, Co, Ni, W, Mo, Cr, Cu, Al, Ti, Zn, Sn, Ta, Nb, and Zr elementary substance metal powders, or alloy powders combining multiple selections of these metal elements.

The composite filter sheet and tube made of a multilayer metal mesh and metal powders is processed to form an asymmetric powder-sintered filter tube by rolling and welding processes.

Referring to FIG. 1, the powder-sintered composite filter sheet/tube with a double- or three-layer structure made according to embodiments of the present invention has the advantages of high filter fineness, low filtration resistance, and high strength and makes substantial progress compared with the prior art.

Embodiment 1: take one wire mesh with the mesh number of 100, two wire meshes with the mesh number of 40, and two wire meshes with the mesh number of 12, each 1000 mm long and 500 mm wide, then stack up these meshes neatly in such a way that the mesh number from top to bottom is 100, 40, 40, 12, and 12 respectively, butt-weld the edges, put the welded structure in a vacuum furnace for 10 hrs. sintering at 900-1500° C. to obtain a supporting layer; after cooling down, take the supporting layer out, and take 1~2 kg of stainless steel 316L, 304, and 310S powder with the mesh number of 100~200 and mix it with 0.1%-20% of forming agent for 1~3 hrs. in a mixer which can be V-shaped mixer or double cone mixer or ball mill; cast a layer of mixed stainless steel powder with thickness of 1~5 mm on the 5-layer mesh supporting layer sintered; then put the composite structure in a vacuum furnace for second sintering at 1000~1600° C.; after cooling down, a composite filter sheet and tube made of a multilayer metal mesh and metal powders is obtained; form the filter sheet/tube by a former and roll the filter sheet/tube into tubular filter elements; at last, weld the middle seam of the filter element with an argon arc welding machine or plasma welding machine; apply the filter element product obtained to the S-Zorb units 101, 102, 103, 104, 105, 110, 111, and 108, raw oil filter 104 units, and hydrotreating F100-B units of China Petroleum and Chemical Corporation for use. Embodiment 2: take one wire mesh with the mesh number of 500, two wire meshes with the mesh number of 40, and two wire meshes with the mesh number of 12*64, each 1000 mm long and 500 mm wide, stack up the five meshes neatly in such a way that the mesh from top to bottom is 500, 40, 40, 12*64, and 12*64 respectively, and butt-weld the edges; put the welded structure in a vacuum furnace for 15 hrs. sintering at 900-1500° C. to obtain a supporting layer; after cooling down, take the supporting layer out, and take 1-2 kg of stainless steel 316L, 304, and 310S powder with the mesh number of 50~600 and mix it with 0.1%~20% of forming agent for 1~3 hrs. in a mixer which can be V-shaped mixer or double cone mixer or ball mill; cast a layer of mixed stainless steel powder with thickness of 1~5 mm in thickness on the 5-layer mesh supporting layer sintered; then put the composite structure in a vacuum furnace for second sintering at 1000~1,600° C.; after cooling down, a composite filter sheet and tube made of a multilayer metal mesh and metal powders is obtained; form the filter sheet/tube by a former and roll the filter sheet/tube into tubular filter elements; at last, weld the middle seam of the filter element with an argon arc welding machine or plasma welding machine; apply the filter element product obtained to the S-Zorb units 101, 102, 103, 104, 105, 110, 111, and 108, raw oil filter 104 units, and hydrotreating F100-B units of China Petroleum and Chemical Corporation for use. Embodiment 3: take one nickel mesh with the mesh number of 100, one mesh with the mesh number of 40 and two meshes with the mesh number of 10, each 1000 mm long and 500 mm wide, stack up the four meshes neatly in such a way that the mesh number from top to bottom is 100, 40, 10, and 10 respectively, butt-weld the edges, put the welded structure in a vacuum furnace for 20 h sintering at 900~1500° C. to obtain a supporting layer; After cooling down, take the supporting layer out, and take 1~2 kg of nickel powder with the mesh number of 50~600 and mix it with 0.1%~20% of forming agent for 1~3 hrs. in a mixer which can be V-shaped mixing equipment or double cone mixer or ball mill; cast a layer of mixed nickel powder with thickness of 1~5 mm in thickness on the 4-layer mesh supporting layer sintered; put the composite structure in a vacuum furnace for second sintering at 1000~1600° C.; after cooling down, a composite filter sheet and tube made of a multilayer metal mesh and metal powders is obtained; form the filter sheet/tube by a former and roll the filter sheet/tube into tubular filter elements; at last, weld the middle seam of the filter element with an argon arc welding machine or plasma welding machine; apply the filter element product obtained to the S-Zorb units 101, 102, 103, 104, 105, 110, 111, and 108, raw oil filter 104 units, and hydrotreating F100-B units of China Petroleum and Chemical Corporation for use.

What is claimed is:

1. A method for producing a composite filter tube and filter element made of multilayer metal mesh and metal powders, comprising:
    weaving wires to form a metal mesh of different mesh numbers, and then stacking up the metal mesh of different mesh numbers to obtain a layered structure on a principle that the mesh number increases from one side to the other, and number of layers of the layered structure is 1~5;
    putting the layered structure in a vacuum furnace for 10~30 hrs uninterruptedly sintering at 900~1500° C. to obtain a multilayer metal mesh;
    after cooling down, taking the multilayer metal mesh out, making a metal composite layer made of metal powders with a mesh number of 100~600 on a side with a higher mesh number of the multilayer metal mesh through electrostatic spraying or common spraying and casting method with a thickness of the metal composite layer controlled within 0.1~0.5 mm;
    sintering the metal composite layer together with the multilayer metal mesh at 900~1500° C., and after cooling down, a composite filter sheet and tube made of a multilayer metal mesh and metal powders with the multilayer metal mesh as a supporting layer and sintered metal powders as a filtering layer is obtained;
    taking the composite filter sheet or tube out and rolling it the composite filter sheet or tube into a tubular filter element with a forming machine; and
    welding a middle seam of the tubular filter element with one of an argon arc welding machine or plasma welding machine to obtain the composite filter tube and filter element made of multilayer metal mesh and metal powders.

2. The method for producing the composite filter tube and filter element made of multilayer metal mesh and metal powders of claim 1, wherein the supporting layer is a composite one of multiple layers of metal meshes.

3. The method for producing the composite filter tube and filter element made of multilayer metal mesh and metal powders of claim 1, wherein the supporting layer has a thickness of 1~19 mm and is formed by stacking up multiple layers of metal meshes with a filter fineness of 1 to 1000 and sintering.

4. The method for producing the composite filter tube and filter element made of multilayer metal mesh and metal powders of claim 1, wherein the supporting layer is made by weaving metal wires and may be sintered with a filtering layer to form a dual-layer composite structure, or be formed with a metal powder sheet to a composite structure.

5. The method for producing the composite filter tube and filter element made of multilayer metal mesh and metal powders of claim 1, wherein the filtering layer has a mesh number of 100~1000 and is attached on the supporting layer and made by low temperature spraying of metal powders and sintering together with the supporting layer.

6. The method for producing the composite filter tube and filter element made of multilayer metal mesh and metal powders of claim 1, wherein metal powders used for the filtering layer are selected from a group consisting of Fe, Co, Ni, W, Mo, Cr, Cu, Al, Ti, Zn, Sn, Ta, Nb, Zr and alloy powders combining multiple selections of these metal elements.

7. The method for producing the composite filter tube and filter element made of multilayer metal mesh and metal powders of claim 1, wherein the multilayer metal mesh used for the supporting layer are formed by weaving metal selected from a group consisting of Fe, Co, Ni, W, Mo, Cr, Cu, Al, Ti, Zn, Sn, Ta, Nb, Zr and alloy wires combining multiple ones of these metal elements.

8. The method for producing the composite filter tube and filter element made of multilayer metal mesh and metal powders of claim 1, wherein the composite filter sheet and tube made of a multilayer metal mesh and metal powders is processed to form an asymmetric powder-sintered filter tube with a composite structure by rolling and welding processes.

* * * * *